United States Patent
Zhang et al.

(10) Patent No.: US 10,484,628 B2
(45) Date of Patent: Nov. 19, 2019

(54) FLEXIBLE PIXEL-WISE EXPOSURE CONTROL AND READOUT

(71) Applicant: The Johns Hopkins University, Baltimore, MD (US)

(72) Inventors: Jie Zhang, Chelsea, MA (US); Ralph Etienne-Cummings, Washington, DC (US); Tao Xiong, Baltimore, MD (US); Trac D. Tran, Ellicott City, MD (US); Sang H. Chin, Cambridge, MA (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 15/785,301

(22) Filed: Oct. 16, 2017

(65) Prior Publication Data

US 2018/0115725 A1    Apr. 26, 2018

Related U.S. Application Data

(60) Provisional application No. 62/411,176, filed on Oct. 21, 2016.

(51) Int. Cl.
| | | |
|---|---|---|
| *H04N 5/355* | (2011.01) | |
| *H04N 5/3745* | (2011.01) | |
| *H04N 5/353* | (2011.01) | |
| *H04N 5/378* | (2011.01) | |

(52) U.S. Cl.
CPC ....... *H04N 5/35563* (2013.01); *H04N 5/3535* (2013.01); *H04N 5/3745* (2013.01); *H04N 5/37455* (2013.01); *H04N 5/378* (2013.01)

(58) Field of Classification Search
CPC ................................. H04N 5/35563
USPC ......................................................... 348/296
See application file for complete search history.

(56) References Cited

U.S. PATENT DOCUMENTS

| | | | | |
|---|---|---|---|---|
| 2003/0164441 A1* | 9/2003 | Lyon | ................... | H04N 3/1562 250/208.1 |
| 2010/0141792 A1* | 6/2010 | Arai | ................... | H04N 5/23248 348/229.1 |
| 2015/0341576 A1 | 11/2015 | Gu et al. | | |
| 2017/0041571 A1* | 2/2017 | Tyrrell | ................... | H04N 5/335 |

OTHER PUBLICATIONS

Bub, G., et al., "Temporal Pixel Multiplexing for Simultaneous High-Speed High Resolution Imaging", Nat Methods. 7(3): 209-211, Mar. 2010.
Gu, J., et al., "Coded Rolling Shutter Photography: Flexible Space-Time Sampling", Mar. 2010.
Hitomi, Y., et al., "Video from a Single Coded Exposure Photograph using a Learned Over-Complete Dictionary", IEEE International Conference on Computer Vision, 287-294, 2011.
(Continued)

*Primary Examiner* — Joel W Fosselman
(74) *Attorney, Agent, or Firm* — Gianna J. Arnold; Saul Ewing Arnstein & Lehr LLP

(57) ABSTRACT

A pixel having a variable exposure for a scene capture device, the pixel comprising a photodiode, a buffer and a memory element and a switching mechanism. The memory element is configured to store an exposure control bit and the switching mechanism configured to control a variable exposure period of the photodiode based on the exposure control bit and to reset a voltage on said photodiode to a reference voltage.

22 Claims, 15 Drawing Sheets

(56) References Cited

OTHER PUBLICATIONS

Koller, R., et al., "High spatio-temporal resolution video with compressed sensing", Optics Express 23(12):15992-16007, 2015.
Liu, D., et al., "Efficient Space-Time Sampling with Pixel-Wise Coded Exposure for High Speed Imaging", IEEE Transactions on Pattern Analysis and Machine Intelligence, Feb. 2014.
Llull, P., et al., "Coded aperture compressive temporal imaging", Optics Express 21(9):10526-10545, 2013.
Nayar S. K., et al., "High Dynamic Range Imaging: Spatially Varying Pixel Exposures", IEEE, 2000.
Zhang, J., et al., "CMOS Implementation of Pixel-Wise Coded Exposure Imaging for Insect-Based Sensor Node", 2015.
Zhang, J., et al., "Compact all—CMOS spatio temporal compressive sensing video camera with pixel-wise coded expos", Apr. 2016.

\* cited by examiner

FLEXIBLE PIXEL-WISE EXPOSURE CONTROL AND READOUT

CROSS-REFERENCE TO RELATED APPLICATION

This application claims priority to U.S. Provisional Patent Application Ser. No. 62/411,176, filed Oct. 21, 2016. The entire content of this application is hereby incorporated by reference herein.

FIELD OF INVENTION

The invention relates generally to a circuit architecture and methods that allow(s) each individual pixel's exposure time to be flexibly controlled within a pixel array. Flexible pixel-wise exposure control allows systems to generate exposure-coded images from a scene-capture device. Using computational techniques, the user can then obtain a high-frame-rate video or a high-dynamic-range (HDR) scene from the single coded image.

BACKGROUND

Field of the Disclosure

This disclosure relates to a CMOS Image Sensor (CIS) with flexible pixel-wise exposure control, allowing on-chip implementation of exposure-coding techniques. Through different exposure and sampling patterns, the sensor can achieve fast acquisition speed, lower power, higher dynamic range, higher signal-to-noise ratio (SNR), and lower motion blur.

Description of the Related Art

CMOS Image Sensor (CIS) performance is directly linked to each pixel's exposure time. Short exposure time is ideal to capture blur-less fast motion, but this leads to a low pixel SNR at low light intensity. On the contrary, long exposure time improves pixel SNR, but at the cost of motion blur and photodiode well saturation. In a frame-based image sensor, exposure is further constrained by frame rate. Consequently, fast frame rate sensors often suffer from low SNR and small dynamic range due to limited pixel exposure.

The control of pixel exposure time is inflexible in frame-based CIS architecture, where all the pixels undergo identical exposure time set by the readout timing. Furthermore, pixel exposure cannot be increased without lowering the frame rate. These limitations severely limit the performance of CIS.

To address inflexibility of the on-chip electronic exposure control, optical based exposure control can be used. Optical exposure control uses off-chip spatial light modulators (SLM) such as digital micro-mirror devices (DMD) or liquid-crystal-on-silicon (LCOS) devices to modulate pixel exposure prior to the sensor focal plane. Using different spatio-temporal optical masks, exposure-coded imaging can capture blur-free motion using a slow frame rate image sensor, high dynamic range (HDR) scene from a single snapshot, and perform spatio-temporal compressed sensing (CS) to capture a fast moving scene using low frame-rate readout. However, despite many performance benefits, an additional opto-mechanical apparatus for exposure control makes these systems not suitable for integration due to a significant increase of the overall system size and power dissipation.

SUMMARY OF INVENTION

The following presents a simplified summary of the invention in order to provide a basic understand of some aspects of the invention. This summary is not extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment a pixel has a variable exposure for a scene capture device, the pixel comprising a photodiode, a buffer and a memory element and a switching mechanism. The memory element is configured to store an exposure control bit. The switching mechanism is configured to control a variable exposure period of the photodiode based on the exposure control bit and to reset a voltage on said photodiode to a reference voltage.

In another embodiment, a scene capture device comprises a plurality of pixels, a plurality of memory drivers and a plurality of analog-to-digital converts (ADCs). Each of the plurality of pixels has a variable exposure for a scene capture device, the pixel comprising a photodiode, a buffer and a memory element and a switching mechanism. The memory element is configured to store an exposure control bit. The switching mechanism is configured to control a variable exposure period of the photodiode based on the exposure control bit and to reset a voltage on the photodiode to a reference voltage. The plurality of memory drivers is coupled to the plurality of pixels and are used to configure the exposure control memory within each pixel. The plurality of ADCs are coupled to the plurality of pixels for digitization.

Another embodiment describes a method for reconstructing a video from a coded image, where the method comprises receiving pixel values and one or more corresponding exposure patterns corresponding to the coded image, determining an optimal video corresponding to the coded image based on theory of compressed sensing by solving an inverse problem with the dictionary for the pixel values, and outputting said optimal video to a storage device.

A further embodiment describes a method for capturing a high dynamic range (HDR) image using a single capture, where the method comprises programming a plurality of pixels to have different exposure lengths, and acquiring pixel values from the plurality of pixels using the plurality of ADCs to form a coded image. Each of the plurality of pixels has a variable exposure for a scene capture device, the pixel comprising a photodiode, a buffer and a memory element and a switching mechanism. The memory element is configured to store an exposure control bit and the switching mechanism configured to control a variable exposure period of the photodiode based on the exposure control bit and to reset a voltage on the photodiode to a reference voltage. The plurality of ADCs are coupled to the plurality of pixels. The coded image is processed using a low pass filter to extract a high dynamic range scene.

DETAILED DESCRIPTION

Embodiments of the invention provide semiconductor architectures of a pixel-wise coded-exposure (PCE) system. The semiconductor architecture provides for a system that is smaller and more power-efficient than a comparable optical system. In one embodiment, the semiconductor process is a CMOS process. Through the use of in-pixel memory and circuit-reset-modulation technique, the PCE system can be designed such that is completed on-chip without using additional optical elements for exposure control. Overall, the semiconductor implementation reduces required size and power, expanding the application of the pixel-wise exposure-coded video compression techniques to small low-power sensing devices. While video scenes may be discussed in various embodiments in the following, the following techniques can be applied to any scene comprising multiple frames. For example, the techniques can be applied to high dynamic range (HDR) images and animated images. In various embodiments, the term "scene" can encompass any scene that comprises multiple frames.

Figure 1:
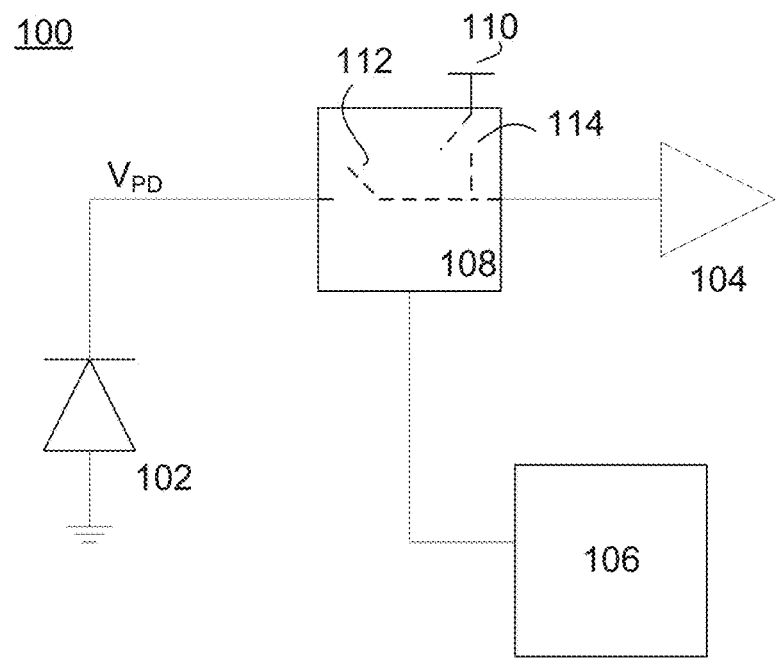
FIG. 1 is a block diagram of a pixel according to an embodiment of the present invention.

Referring now to the drawings, FIG. 1 illustrates a pixel 100 for a scene-capture device. Pixel 100 includes a photodiode 102, buffer 104, memory element 106 and switching mechanism 108. Photodiode 102 has a variable exposure period and is selectively coupled to buffer 104 and a reference voltage through switching mechanism 108. Memory element 106 stores an exposure control bit that determines the variable exposure period for photodiode 102 and pixel 100. Switching mechanism receives one or more control signals from memory element 106 based on the exposure control bit to determine when to start and stop the exposure period of photodiode 102. Buffer 104 isolates photodiode 102 from other readout circuits and circuit elements of the scene capture device.

Switching mechanism 108 can include first and second switches. The first and second switches control when the exposure of the photodiode 102 starts and stops by preventing the pixel from reset. The first switch 112 selectively couples the photodiode 102 to the buffer 104 and readout circuitry and the second switch 114 selectively couples the photodiode 102 to a reset voltage.

Figure 2:
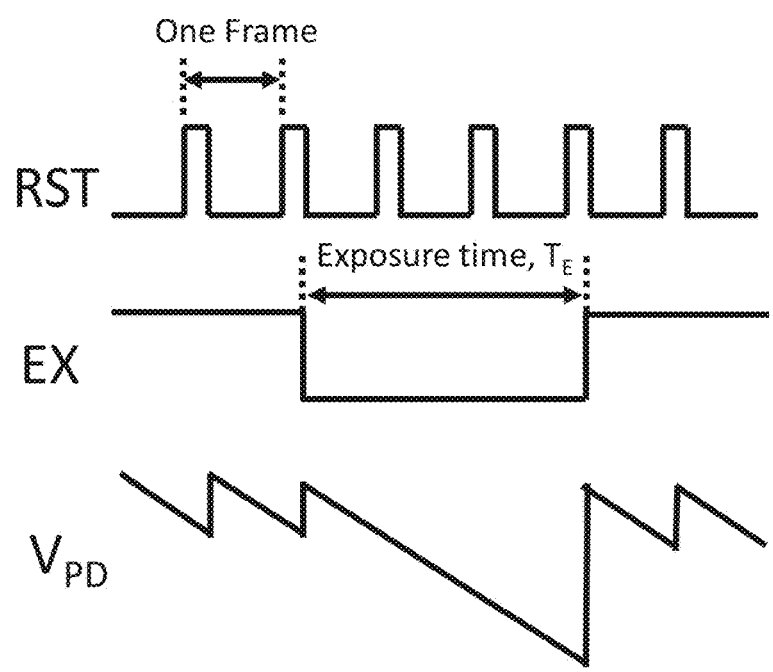
FIG. 2 illustrates a timing diagram for the pixel control signals according to an embodiment of the present invention.

FIG. 2 illustrates an example timing diagram for switches 112 and 114 of switching mechanism used in pixel exposure control. The "EX" signal corresponds to the control of switch 112 and "RST" signal corresponds to the control of switch 114. "$V_{PD}$" refers to the voltage on the photodiode 102. When a signal is set "high", a switch is closed; otherwise, it remains open. When switch 112 is closed, the toggling of switch 114 at the beginning of each frame within the video frame resets the voltage on the photodiode 102 to the reference voltage. When switch 112 is open, it isolates the voltage on the photodiode 102 from the input of the buffer 104 and the voltage on the photodiode 102, $V_{PD}$. Therefore, $V_{PD}$ continues to discharge regardless of the state of switch 114. The exposure period ends for pixel 100 and photodiode 102 when switch 112 closes in response to control signal EX toggling high. By controlling at what points switch 112 is closed and open, pixel 100's exposure time can be well-determined. Switching element 108 can also include one or more additional switches disposed between photodiode 102 and buffer 104 configured to implement a correlated double sampling (CDS) technique.

In FIG. 1, a memory element 106 stores a control bit that can be used to generate the control controlling the status of switch 112, and, in turn, the variable exposure period of photodiode 102. In one embodiment, memory element 106 is a static random access memory (SRAM) block. Further, memory element can be a 1-bit memory.

Figure 3:
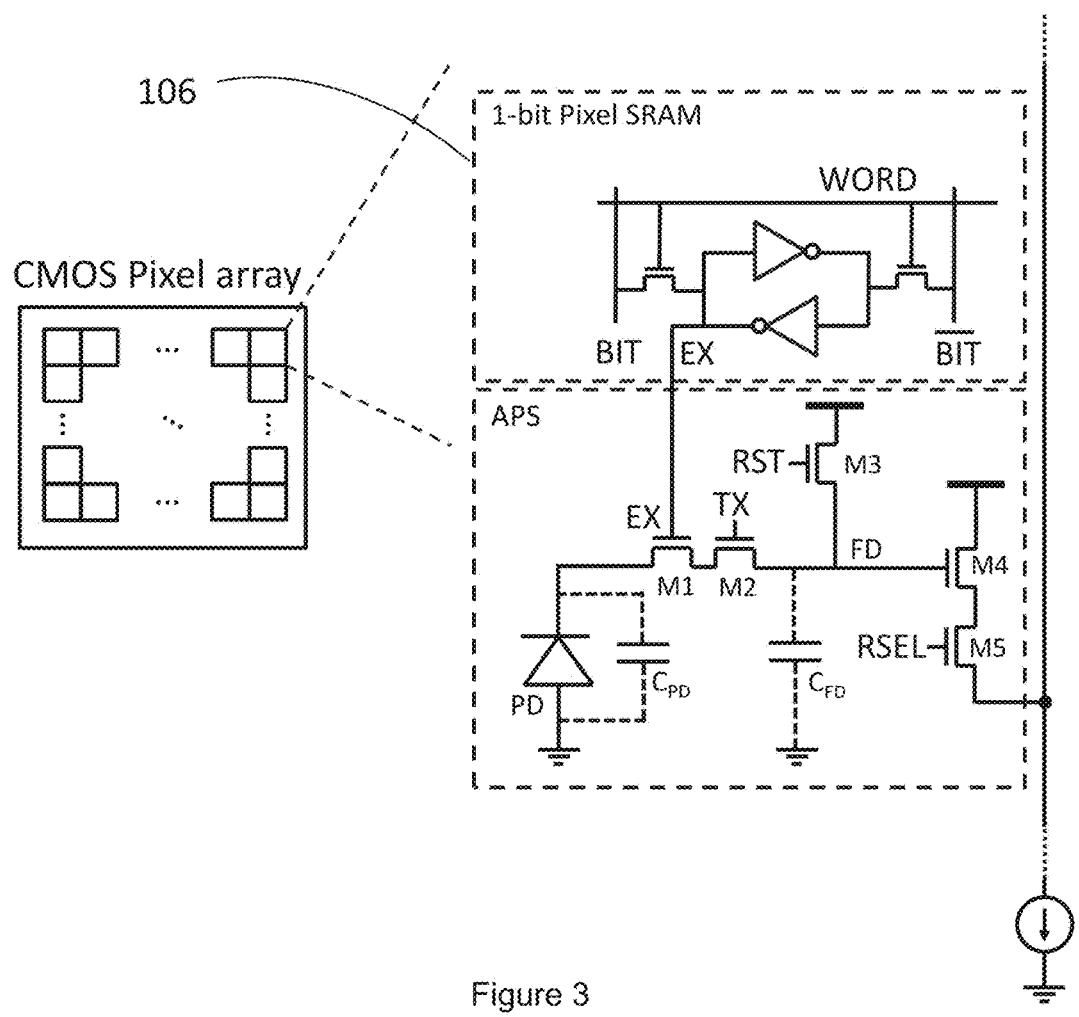
FIG. 3 is a circuit level implementation of a pixel according to an embodiment of the present invention.

FIG. 3 illustrates a circuit-level implementation of pixel 100 having an Active Pixel Sensor (APS) block and a 1-bit SRAM block 106. The APS block implements switches 112 and 114 with transistors M1 and M3. M2 switch is the transfer gate used in a 4T APS. Transistors M4 and M5 form the buffer and row selection control.

Figure 4:
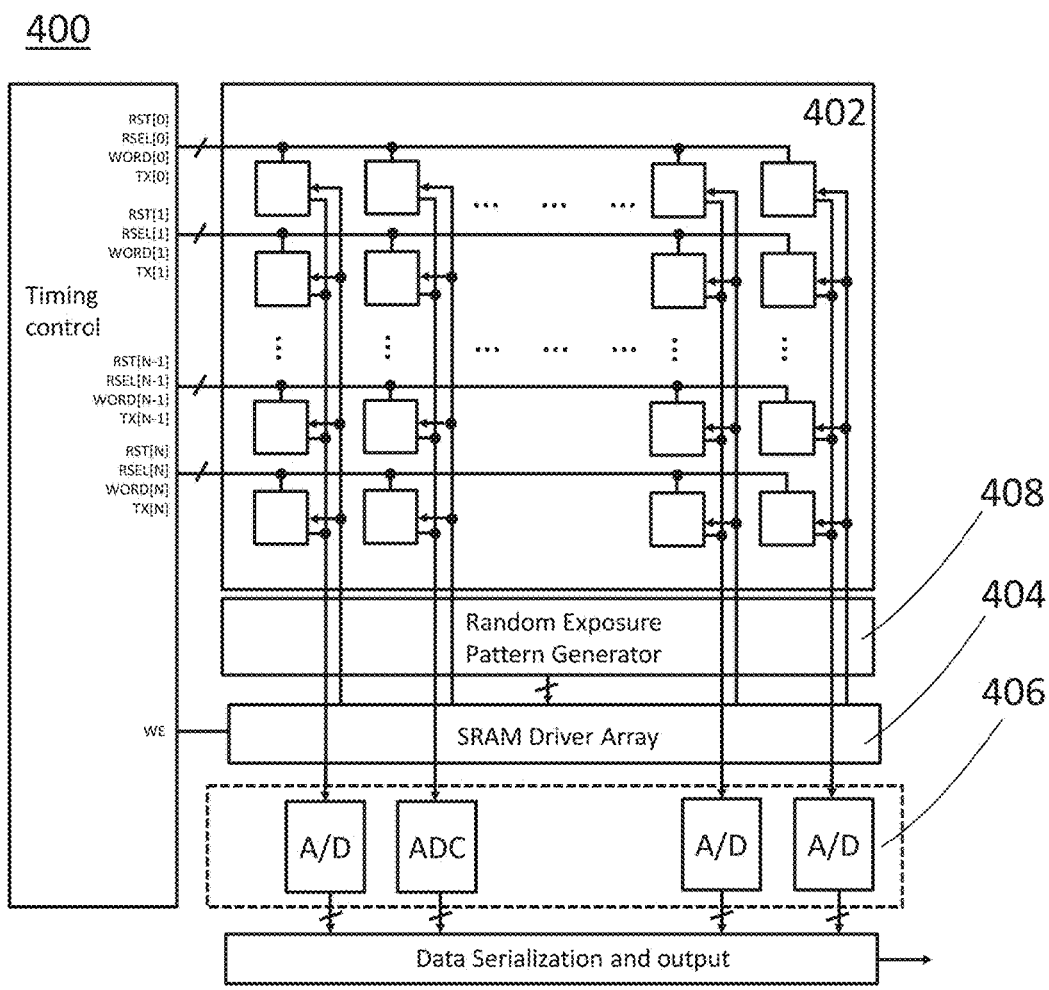
FIG. 4 illustrates a system-level implementation of a scene capture device according to an embodiment of the present invention.

FIG. 4 illustrates a scene-capture device 400 including a pixel array 402, a plurality of SRAM drivers 404, and a plurality of analog-to-digital converters (ADCs) 406 coupled to the pixels of the pixel array 402. In one embodiment, each pixel in a row of pixels is selectively coupled to a plurality of ADCs 406. Further, each pixel in a row can be selectively coupled to a different memory driver of the plurality of drivers 404. Each pixel of the pixel array 402 can include the elements as described with regard to FIGS. 1 and 3.

The plurality of memory drivers 404 load the exposure-control bit into the memory block of each pixel. In one embodiment, the plurality of drivers is SRAM write drivers coupled to SRAM write values. In various embodiment, the plurality of drivers receives the exposure-control bits to be loaded into the memory blocks of the pixels from either on-chip or off-chip.

Each pixel of the array 402 can be coupled to an ADC to digitize its pixel value. In one embodiment, each pixel in a row of pixels is coupled to a different ADC of the plurality of ADCs 406. Further, each pixel in a column of pixels can be coupled to a common ADC. The plurality of ADCs 406 can be configured in accordance with exposure control bits and can use this information such that each ADC can remain in an idle or low-power mode until a corresponding pixel is at the end of its exposure period.

The embodiment of FIG. 4 illustrates the plurality of ADCs on the same integrated circuit as the pixels and plurality of drivers. In other embodiments, one or more of the plurality of ADCs, plurality of pixels, and plurality of drivers can be disposed on separate integrated circuits.

In one embodiment, a row-scan technique is used to control and read out the pixels. In such an embodiment, the pixels are read out one row at a time. The rows can be read out in a sequential manner or a non-sequential manner. In one embodiment, one or more global signals can be used to control writing to the memory blocks of each pixel, selecting rows of pixels to be read out and providing a reset timing signal. The signals can be provided by a signal-timing block. For example, FIG. 4 illustrates control signals "RST", "RSEL", "WORD", "TX" and "WE". Control signal "RST" controls the reset period of each photodiode defining the period for reset timing. Control signal "RSEL" selects which row of pixels will be read out to the ADCs. Control signal "WORD" controls when each memory block is written with an exposure control bit.

With reference to FIG. 3, memory block 106 receives BIT and BIT signals from a memory driver in 406 of FIG. 4. The value is then written into the memory block 106 by toggling the WORD signal. Control signal TX controls the timing of transistor M2 of FIG. 3, which acts as a switch for an optional embodiment employing correlated double sampling that can be used to reduce pixel-reset noise. Control signal WE enables the memory drivers when active, allowing the in-pixel memory 106 to be written by the driver in 406.

Figure 5:
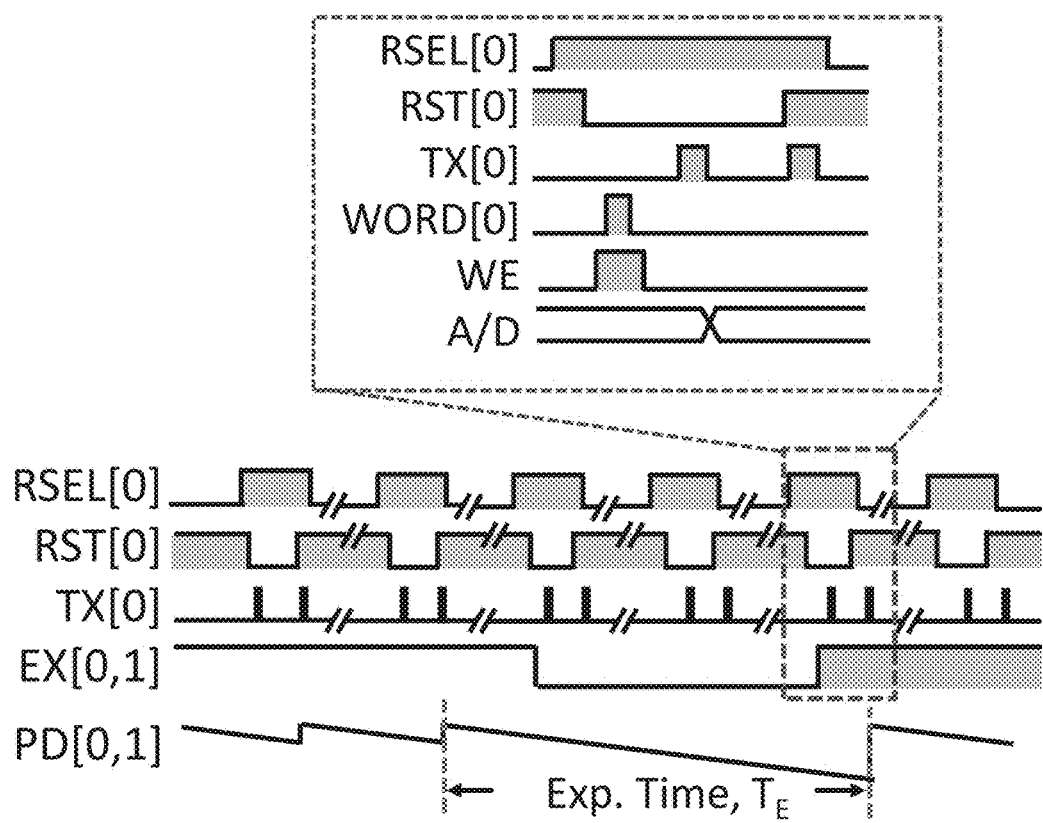
FIG. 5 depicts an example timing for pixel at [row 0, column 1], a row-selection sequence, and a circuit diagram for the SRAM write driver according to embodiments of the present invention.

FIG. 5 illustrates an example timing diagram of the pixel at location Row 0, Column 1 using control signals mentioned above. The row select signal for Row 0, RSEL[0] goes high to initiate a row readout. Then the SRAM write enable signal, WE, pulses high, enabling the SRAM driver if its corresponding RENB bit is '1'. WORD[0] then goes high to write the bit line values to the pixel SRAM at row 0. If the corresponding SRAM driver is enabled, new values will be written into the pixel. Otherwise, the pixel SRAM retains the previous value. When EX value at Row 0, Column 1 (EX[0,1]) is low, the PD[0,1] voltage continues to integrate. When EX[0,1] is high, the PD[0,1] voltage stops integrating and is converted to digital value through A/D. In one embodiment, prior to digitization, two samples taken before and after reset to allow for Correlated Double Sampling (CDS).

Figure 6:
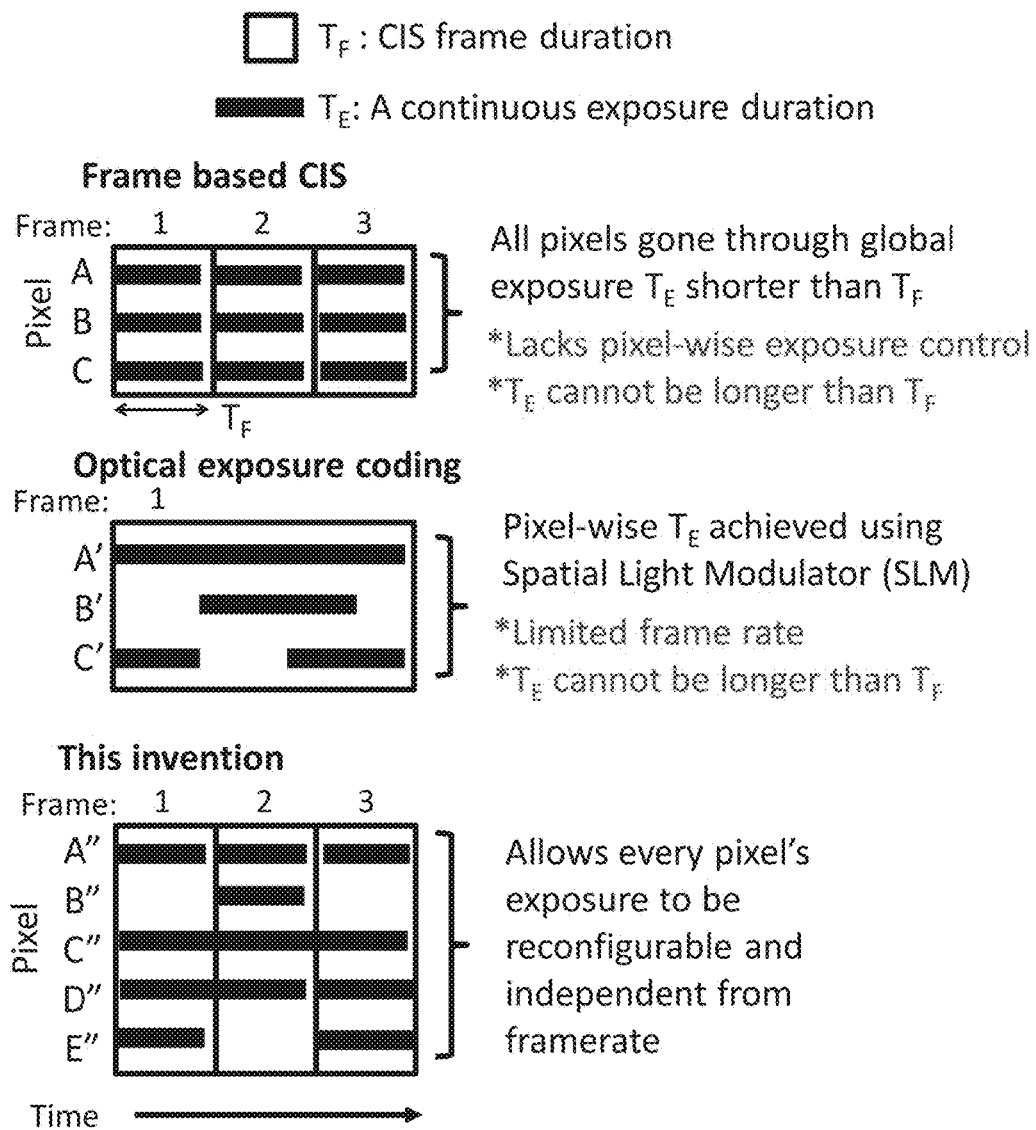
FIG. 6 depicts a comparison of exposure control in: frame-based CIS, optical-based exposure coding, and a sensor according to embodiments of the present invention.

The described invention above allows for on-chip pixel-wise exposure control. FIG. 6 summarizes the difference of this invention to other related arts. Referring now to FIG. 6, in a frame-based CIS, exposure control is typically controlled globally for all the pixels with predetermined line addressing timing, as illustrated in Pixels A, B, and C. Because a pixel must be reset before the start of the next frame, a pixels' maximum exposure time is bounded by the frame duration, $T_F$. Compared to the electronic exposure control, optical-exposure-coded imaging can achieve flexible pixel-wise exposure, illustrated by pixels A', B', and C'. To achieve this, a spatial light modulator (SLM) is inserted between the objective lens and image sensor focal plane to modulate the light prior to the sensor. Within one frame, the pixel value from multiple-on exposures such as pixel C' will be summed when the pixel is sampled at the end of a frame. But despite the pixel-wise exposure flexibility, the frame rate of the camera system is still limited by the longest exposure time.

In the invention as described previously, the readout and exposure is independently configured for every pixel (e.g., pixels A"-E"). In addition, a pixel's exposure is no longer bounded by the frame duration and, instead, can be exposed for a multiples of the unit exposure time determined by the maximum readout speed, as illustrated by pixels C"-E". In this architecture, an ADC only samples the pixel at the end of its exposure. Note in D", the pixel is sampled at the end of the first exposure before a second exposure takes place.

The embodiment of this invention provides flexibility for many exposure coding imaging applications. Many previously reported exposure coded computational imaging systems can also benefit from this architecture using an all-CMOS on-chip implementation without additional optical modulators. To illustrate this, Applicant demonstrates two applications using the proposed CIS: single-shot HDR image synthesis using coded exposure and spatio-temporal compressed sensing.

Single-Shot HDR Using Spatially Varying Exposure Mask

Figure 7:
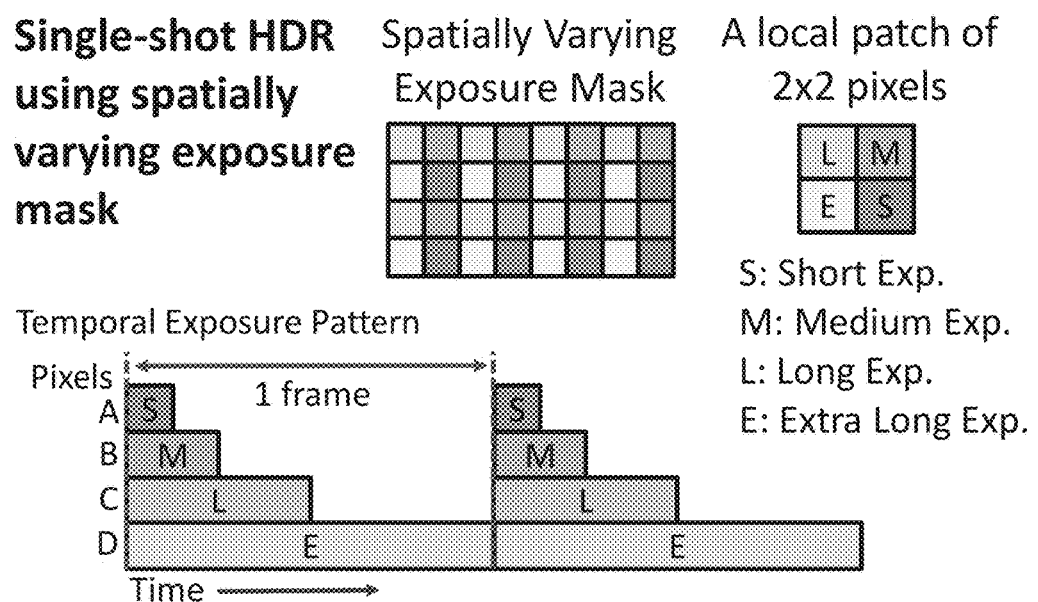
FIG. 7 depicts an example of exposure coded imaging techniques that can be implemented on one embodiment of the invention: a single-shot HDR using spatially varying exposure mask.
Figure 11:
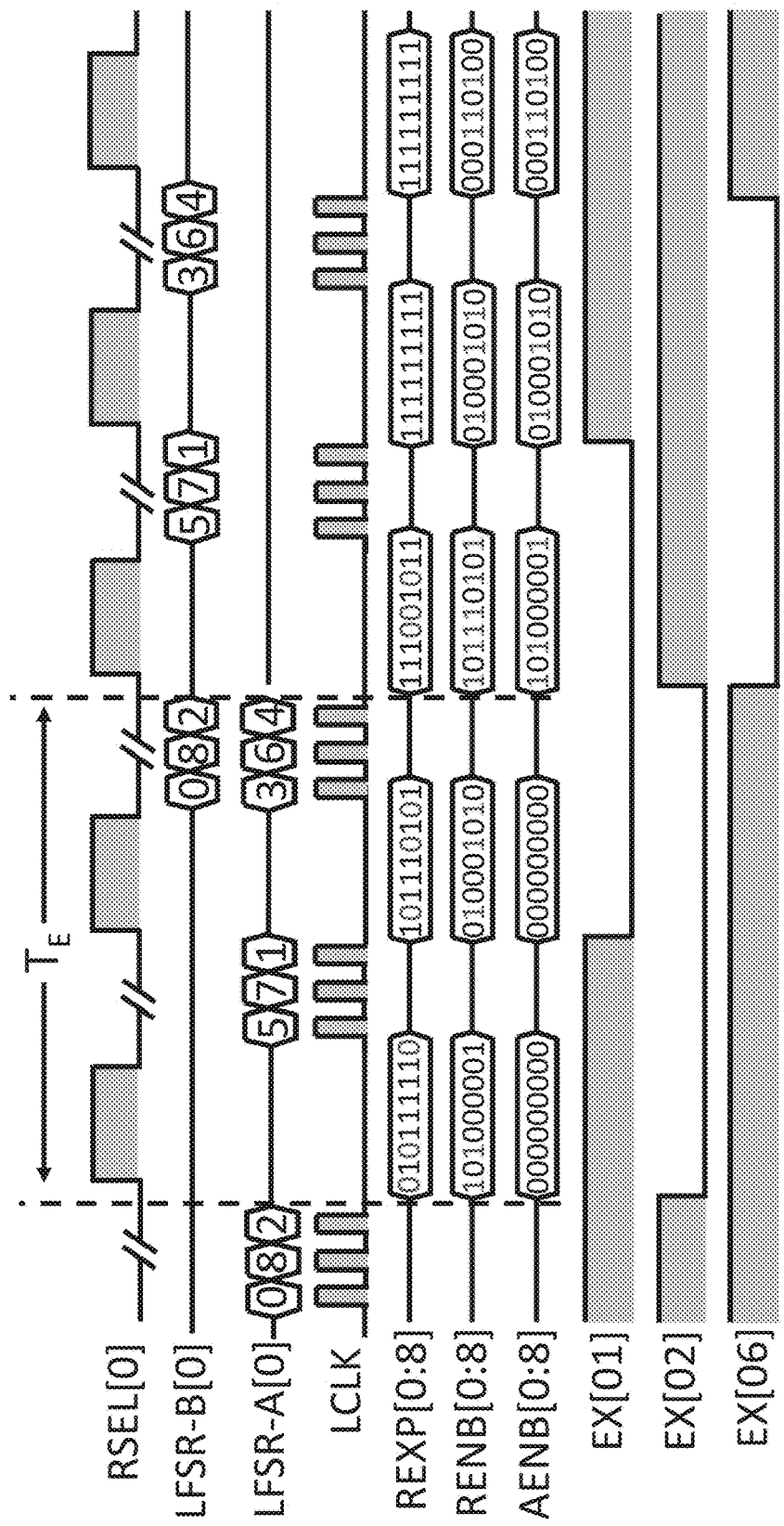
FIG. 11 depicts an example timing diagram of the random exposure pattern generator (REPG) block according to embodiments of the present invention. Two LFSRs per row, with delay, generate the on and off timing for pixels within that row.

Referring to FIG. 7, previous published work (Nayar & Mitsunaga) showed that by using a spatially varying exposure (SVE) mask, one can capture high dynamic range (HDR) videos using a single snapshot, as opposed to using a combination of multiple images sampled at different exposures. Implemented optically, the SVE mask provides the flexibility of spatially controlling the exposure time $T_E$ of individual pixels in a neighboring region. For example, given a local 2×2 pixel patch, shown in FIG. 7, four neighboring pixels are assigned with different exposures from short to long. A temporal view of these pixels' exposure is also shown in FIG. 11. The exposure pattern is repeated over the sensor focal plane to generate the SVE coded image. Using the SVE mask, pixels simultaneously capture both low brightness and high brightness locally. When a pixel with long exposure is saturated, the neighboring pixels with shorter exposures are able to sense the brightness without saturation. On the other hand, when a pixel with short exposure generates a low and noisy response under low illumination, neighboring pixels with longer exposures can produce a high SNR measurement. From the SVE coded image, a simple low-pass filtering could result in a HDR image.

Figure 8:
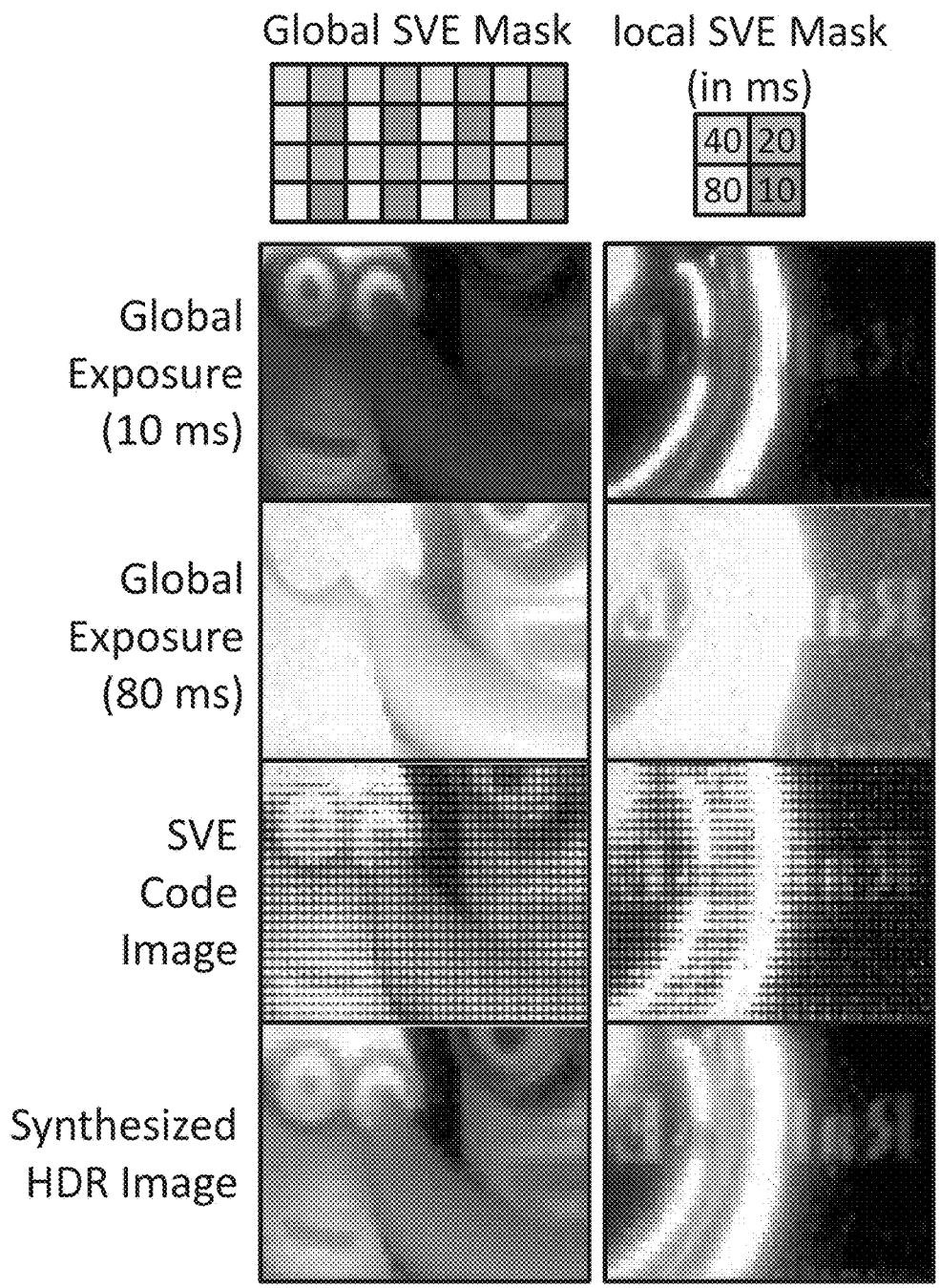
FIG. 8 provides HDR images with single snapshot with spatial-varying exposure (SVE) mask. SVE mask are shown at the top of the figure. The first and second rows of the image show the scene captured under global exposure with 10 ms and 80 ms. The third row shows SVE output from an embodiment of the invention. The fourth row shows the synthesized HDR image from the sensor output.

FIG. 8 shows the output of the invention and reconstructed HDR image using SVE mask. To acquire exposure-coded frames, the pixels on the sensor focal plane using the spatially varying exposure (SVE) mask were configured to provide pixels with 10, 20, 40 and 80 ms exposure times, respectively. This is done by loading the exposure pattern to the in-pixel SRAMs. The acquired coded images, "SVE Coded Image", are shown in row 3 of FIG. 8. The grid-like pattern on coded image confirms that pixels exposures are correctly configured. To reconstruct a HDR image, spatial low pass filtering was applied with a 3×3 filter across the entire coded images. To confirm the HDR effect, Applicant also took snapshots of the same scenes using 10 ms and 80 ms global exposure. For the image on the left column, the MINIONS® toy in front is under-exposed with 10 ms global exposure, while the one in the back is over-exposed with 80 ms global exposure. These are compared to the synthesized HDR image, where both are well-captured.

For the image in the right column of FIG. 8, under short exposure, the light contour is clearly visible while the text placed in front of the light is underexposed. At long exposure, the light completely saturates most of the focal plane. In the synthesized HDR image, both the light contour and the text are well-acquired. As expected, application of a low-pass filter to acquire the HDR image results in the loss of some spatial resolution compared to global exposure.

Spatio-Temporal Compressed Sensing Through Pixel-Wise Coded Exposure

Figure 9:
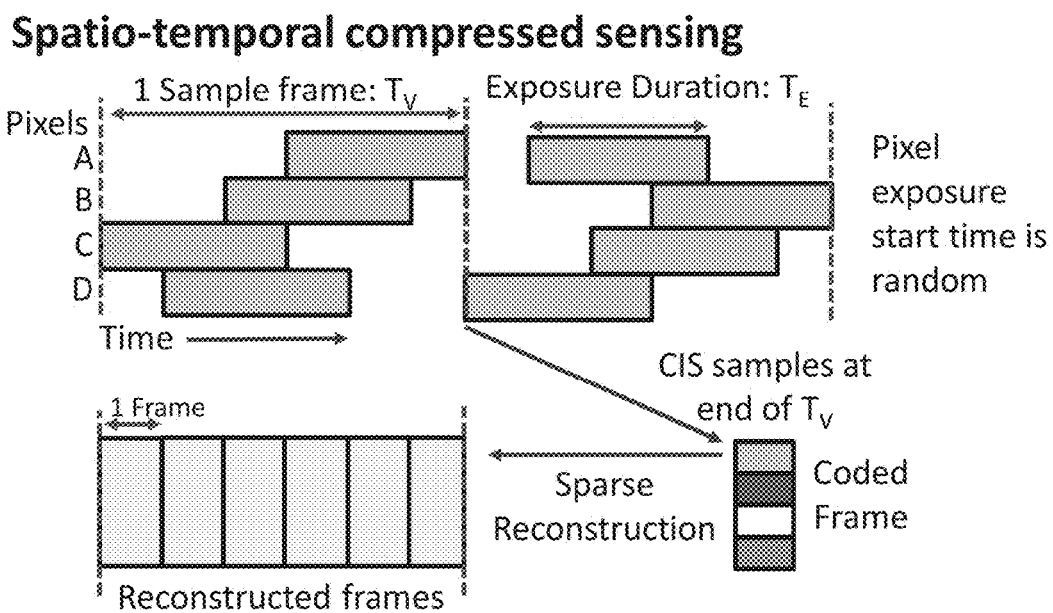
FIG. 9 depicts another example of exposure-coded imaging techniques that can be implemented on one embodiment of the invention: spatio-temporal compressed sensing.

Referring to FIG. 9, one embodiment of the invention can also implement spatio-temporal compressed sensing (STCS). STCS is a computational imaging method to capture high frame rate video using a low frame readout rate. This method can preserve both the spatial and temporal resolution of the video. FIG. 9 illustrates the STCS acquisition flow. In STCS, pixels are exposed through a random single exposure of fixed duration $T_E$ within $T_V$, the spatio-temporal space of the video. The image sensor only reads out the pixel value at the end of $T_V$ with readout frame rate of $1/T_V$. STCS essentially compresses a video of duration $T_V$ into a single coded frame. In one embodiment, the STCS recovery algorithm reconstructs the entire video from this single coded frame using sparse spatio-temporal reconstruction with a spatial temporal dictionary. In another embodiment, the STCS recovers the video from single code frame using an over-complete dictionary. Assuming N frames are reconstructed from a single coded frame, the compression rate would be N. STCS is also different from the traditional spatial CS approach, which recovers one frame using multiple random spatial samples. Thus, STCS is more optimal for video applications because the sparse samples include both spatial and temporal information. Optical implementations have shown that STCS is capable of extracting low blur videos from dynamic scenes with occlusions, deforming objects, and gas and liquid flow.

Figure 10:
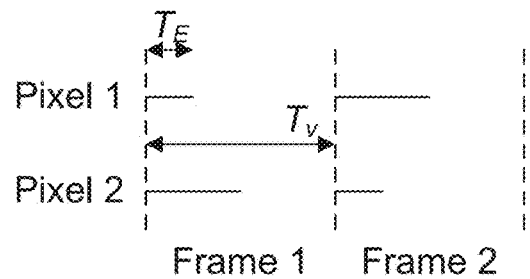
FIG. 10 depicts a variety of exemplary exposure periods for two pixels over two frames according to an embodiment of the present invention.
Figure 10:
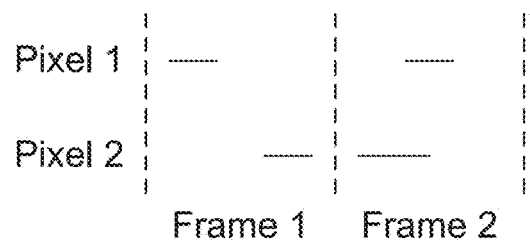
Figure 10:
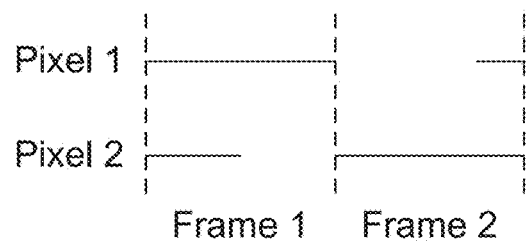
Figure 10:
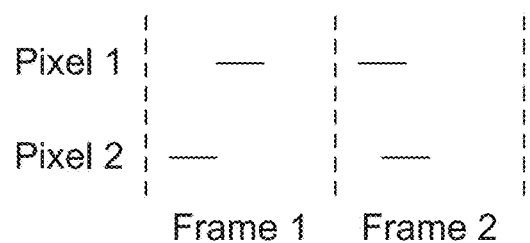

For STCS, each pixel of scene-capture device can have an exposure period that can vary from video frame to video frame. FIG. 10 depicts a variety of exemplary exposure periods for two pixels over two frames. $T_V$ denotes the frame length, while $T_E$ represents the exposure duration. In one embodiment, the exposure frames have a fixed duration, but vary when they start and stop during video frames. In another embodiment, the exposure frames have a variable duration. In one specific example, pixel 1 can have a first exposure period during a first video frame and a second exposure period during a second video frame, where the first and second exposure periods are different. The first and second exposure periods can start at different points of each video frame. Further, in another example, pixel 1 has a first exposure period and pixel 2 has a second exposure period during a first video frame, where the first and second exposure periods differ. The first and second exposure periods can differ such that they start and stop at different points within the video frame, having a fixed exposure period. In other example embodiments, the exposure period differs between each pixel. As is used above, in various embodiments, a row of pixels can refer to one or more pixels that are aligned along a common row of the pixel array. In another embodiment, a row of pixels can refer to any grouping of pixels that are selected for readout at during a common period. The pixels can be grouped in any order such that each pixel is exposed and read out during a video frame.

Embodiments of the invention can also implement a local on-chip random-exposure pattern generator (REPG) dedicated to generate single-on random exposure patterns for compressed sensing applications. As discussed previously, in one exemplary single-on random exposure measure, each pixel is exposed only once for a duration of $T_E$ within $T_V$. The starting time of the single-on exposure can be random, as shown in FIGS. 9 and 10.

Figure 12:
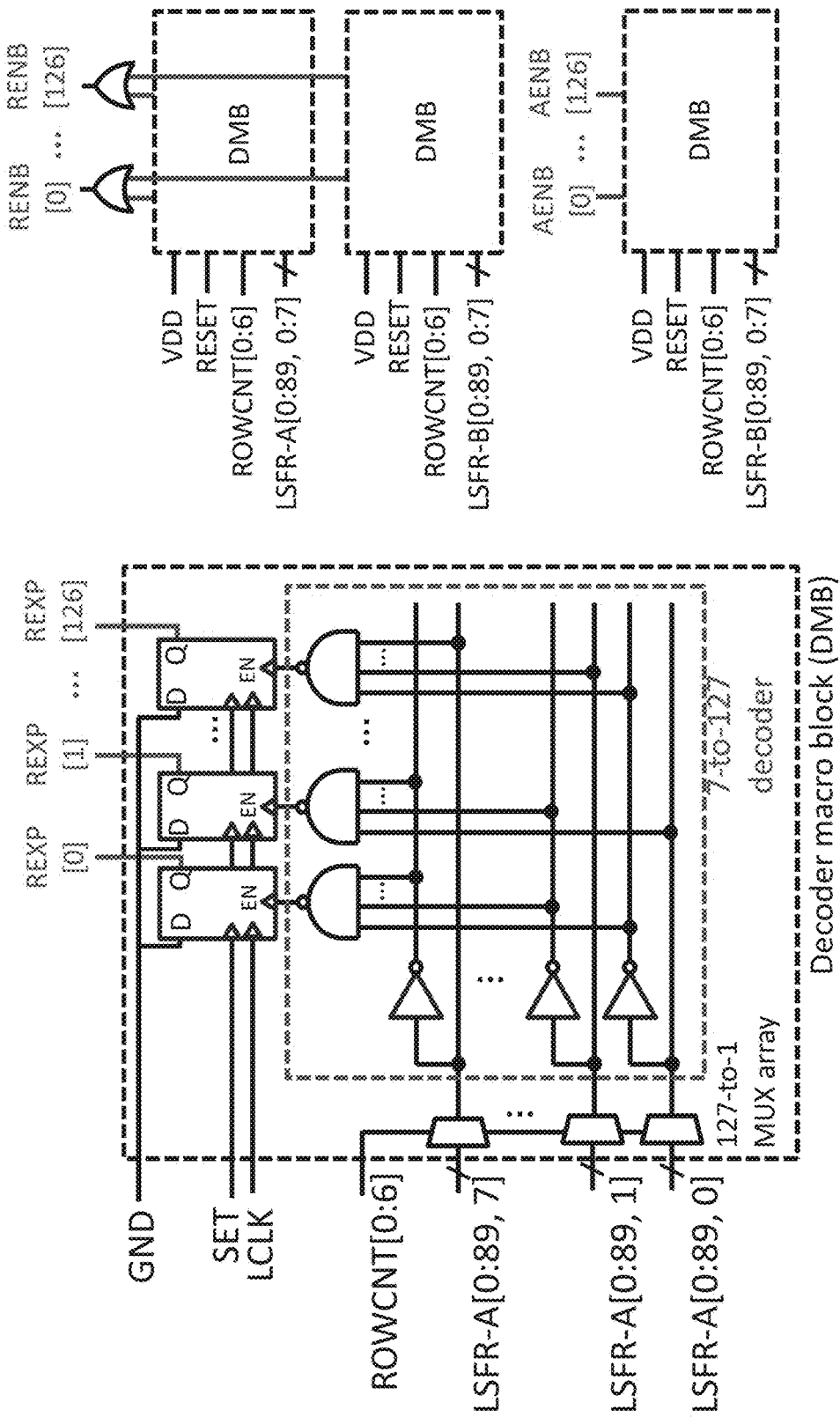
FIG. 12 depicts an REPG block schematic according to embodiments of the present invention. Decoder macro blocks (DMB) are used in conjunction with LFSRs to generate the random exposure timing.
Figure 13:
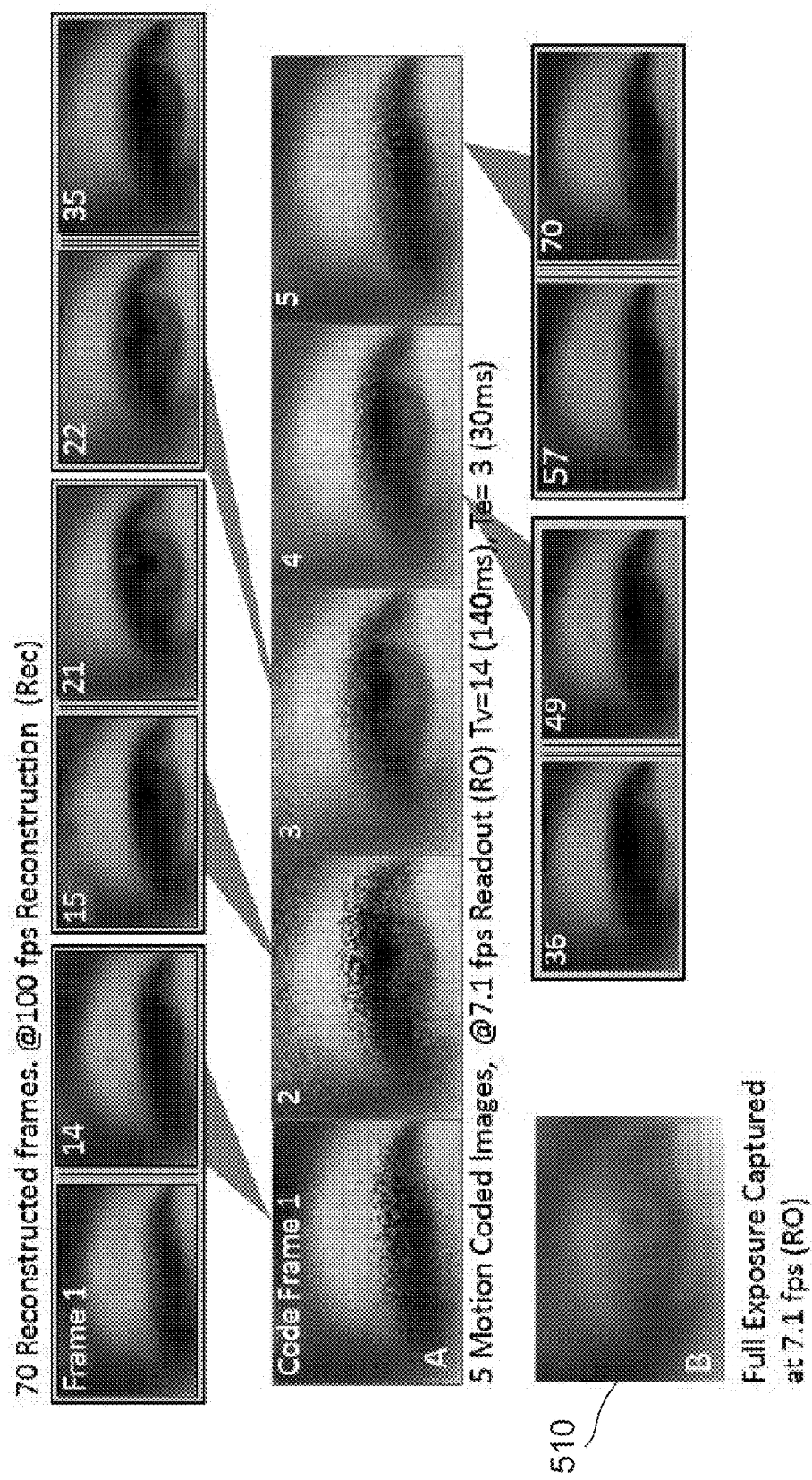
FIG. 13 illustrates various frames from a reconstructed video scene from coded exposures according to an embodiment of the present invention.

FIG. 11 shows an example-timing diagram of the REPG block in one embodiment of the invention and FIG. 12 show an example implementation of FIG. 13. REPG uses two identical linear feedback registers (LFSR) per row of pixels. LFSRs with different connected tap are used as pseudo random generators. LFSR-A generates the pixel number to start exposure. After a certain delay, an identical LFSR-B generates the pixel number to end the exposure. Although the implementation example in FIGS. 11 and 12 assumes the pixel array contains 127 columns and 90 rows, the REPG implementation is scalable to arbitrary pixel array size. This implementation uses two identical 7-bit LFSRs per row of the pixel array to generate random exposure control values. LFSR-A[0] generates pixel values to start exposure at row 0, while an identical copy, LFSR-B[0], generates pixel values to stop exposure at the same row. Before the row select signal, RSEL[0], goes high to select the 0th row for readout, LFSR-A[0] is clocked N times by LCLK to generate N random row indexes. LFSR-B[0] also generates the same N random numbers after a delay of $T_E$. N can be a function of $T_E$ and $T_V$ where $$N = \left\lceil \frac{\text{Number of Pixels in a Row}}{T_V - T_E + 1} \right\rceil.$$

The RENB vector puts '1's at LFSR-A and LFSR-B generated numbers to enable SRAM write at these locations. The REXP vector puts '0's at LFSR-A generated locations and '1's at LFSR-B-generated locations. These values are then loaded into the RAM to start and stop the pixel exposure. AENB puts '1' at the LFSR-B[0]-generated indexes to allow the ADC to sample the exposed pixels. To simplify the illustration, FIG. 13 assumes there are only 9 pixels in this row. Each time, the LFSRs generate N=3 random numbers.

Embodiments of the invention use custom-designed decoder macro blocks (DMB) to implement the timing diagram in FIG. 11. An example of the DMB used to implement REXP signal is shown in FIG. 12. This example assumes a pixel array with 127 columns and 90 rows. Here, a 7-to-127 decoder can be used to assign the 7-bit LSFR-A output to a 127-length vector that contains zeros except at the location corresponding to the LSFR-A output. The output of the 7-to-127 decoder enables the input of the registers. The registers' outputs are initialized to '1's by the SET signal on the register. Following each LCLK edge, only the registers at location that corresponds to the LFSR-A output becomes '0'. To share the decoder and registers, each bit of the LSFR-A is multiplexed to the input of the 7-to-127 decoder via a 127-to-1 multiplexor.

FIG. 12 also shows the implementation of the AENB and RENB signals. The LSFR-B output is used to generate the AENB vector. The registers are initialized to '0's, and each LCLK edge sets the corresponding register output to a '1'. Both LFSR-A and LFSR-B outputs are used to generate RENB vector. The outputs of the decoders are merged together using a bit-wise 'OR' gate to give RENB. The 90-to-1 multiplexors at the DMB can be shared across DMBs. One embodiment of the invention uses a total of 14 90-to-1 multiplexors.

The STCS sampling and reconstruction steps can be illustrated mathematically. In one embodiment, to determine the reconstructed video scene, an optimal video corresponding to the coded image is determined by solving an inverse problem using an over-complete dictionary. For example, let there be spatiotemporal video scene $X \in \mathbb{R}^{M \times N \times T}$ where M×N indicates the size of each frame, T indicates the total number of frames in the video and X(m, n, t) is the pixel value associated with frame t at position (m,n). A sensing cube, $S \in \mathbb{R}^{M \times N \times T}$ stores exposure control values for pixels at (m, n, t). The value of S(m, n, t) is 1 for frames $t \in [t_{start}, t_{end}]$ and 0 otherwise, where $[t_{start}, t_{end}]$ denotes the start and end frame numbers for a particular pixel. For compressed sensing, $t_{start}$ is randomly chosen for every pixel and is based on the exposure-control bits in the random exposure sequence, while exposure duration is fixed.

To acquire a coded image, $Y \in \mathbb{R}^{M \times N \times T}$ video X is modulated by the S before projection across multiple temporal frames. The value of a pixel Y at location (m,n) is computed as:

$$Y(m, n) = \sum_{t=1}^{T} S(m, n, t) \cdot X(m, n, t) \quad (1)$$

During reconstruction, the reconstructed spatiotemporal video, $\hat{X} \in \mathbb{R}^{M \times N \times T}$ can be recovered by solving:

$$\hat{X} = \operatorname{argmin}_a \|a\|_0 \, s.t. \, \|Y - SDa\|_2 \leq \varepsilon \quad (2)$$

where $D \in \mathbb{R}^{M \times N \times T \times L}$ is the over-complete dictionary. M×N×T denotes the dimension of the single spatiotemporal dictionary item and L denotes the overall size of the dictionary. $a \in \mathbb{R}^L$ is the sparse representation of X using the dictionary D. ε is the tolerable reconstruction error. Further, a learning algorithm such as the K-SVD algorithm can be used for the dictionary learning. Other dictionary methods can be used as well.

FIG. 13 shows example video frames of a blinking eye recorded by scene-capture device 400. In this example, the unit time for exposure duration $T_E$ is 10 ms. Thus $T_E$ can take value at the multiple of 10 ms. As such, without temporal compression, the image sensor can output videos at a rate of 100 frames per second (FPS). For compressed sensing application, $T_E$ can be set to 30 ms, and the reconstructed video duration $T_V$ to 140 ms. Hence, the readout (RO) speed of the sensor is reduced to 7.1 FPS (100/14). Each pixel undergoes 30 ms of exposure, corresponding to $T_E$=30 ms (i.e., 3×30 ms). The sensor compresses 14 frames ($T_V$=140 ms) into one single coded image through coded exposure.

Five coded images are shown in the middle row of FIG. 13: coded frames 1-5. From each of these coded images, 14 video frames are reconstructed. Equation 2 can be used for reconstructing the video frames. The result of the recovery is a 100 FPS equivalent video with low blur effect. As a comparison, at the same RO speed of 7.1 FPS, a global exposure captures a severely blurred image shown as element 1301 of FIG. 13.

In one embodiment, to reconstruct a video from the global exposure fame, a block-wise approach is implemented. The coded image from the global exposure frame is broken down into blocks. A spatiotemporal cube can then be reconstructed by using a dictionary. In one specific example, the coded image is broken down into an 8×8 segment and a spatiotemporal cube with parameters of 8×8×14 can be reconstructed using a dictionary. The dictionary may have a size of 896×3000 parameters, but in various embodiments, the size of the dictionary can vary and be based on at least one of the output FPS, the features of the video frame, and number of pixels in the scene capture device. The coded image can be segmented into different size blocks and dictionaries of different sizes can be used to generate a spatiotemporal cube of different sizes. The reconstructed video scene can be stored to a memory of a computer system and/or displayed on a display of a computer system.

The dictionary can be trained based on data from various objects and movement at a desired output frame rate. For example, the dictionary can be trained based on data at a rate of 100 FPS. Further, a K-SVD algorithm may be used to train the dictionary based on the data. Other algorithms may also be used. In one embodiment, the dictionary can be referred to as an over-complete dictionary.

Figure 14:
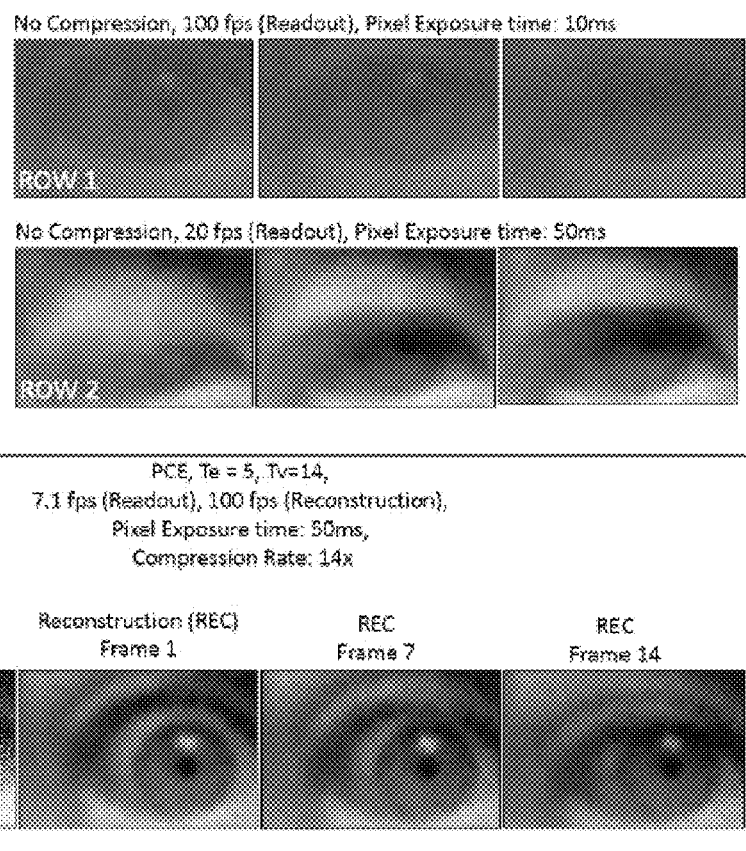
FIG. 14 illustrates a coded image with enhanced scene signal-to-noise ratio and reduced motion blur according to an embodiment of the present invention.

FIG. 14 illustrates an example coded image sensor that can be used to at least one of reduce readout speed, enhance video SNR and reduce motion blur. The images of ROW 1 show frames from a video of a blinking eye captured by the image sensor without the use of any coding techniques. The video is a 100 FPS video with 10 ms frame-exposure time between frames. The SNR and contrast of the scene is low as the signal level is weak. ROW 2 shows another example implementation. The video of ROW 2 was captured with 20 FPS with a 50 ms exposure time between frames. The scene SNR increases; however, there is a noticeable increase in motion blur and a reduced frame rate. ROW 3 illustrates the coded image and recovered frames from an example embodiment where a coded image is used. In this example, the value of Te was set to 5 providing a 50 ms exposure time. Due to the additional exposure time, SNR of the coded image was improved. Further, by applying a dictionary trained to reduce blurring and for a selected reconstructed method, blurring within the reconstructed video is reduced compared to that of ROW 2. In one embodiment, the dictionary is trained using blue-free 100 FPS videos for sparse reconstruction. The dictionary can represent the scene with very few components. Furthermore, the readout rate of ROW 3 readout rate is 14 times less than that of ROW 1.

Figure 15:
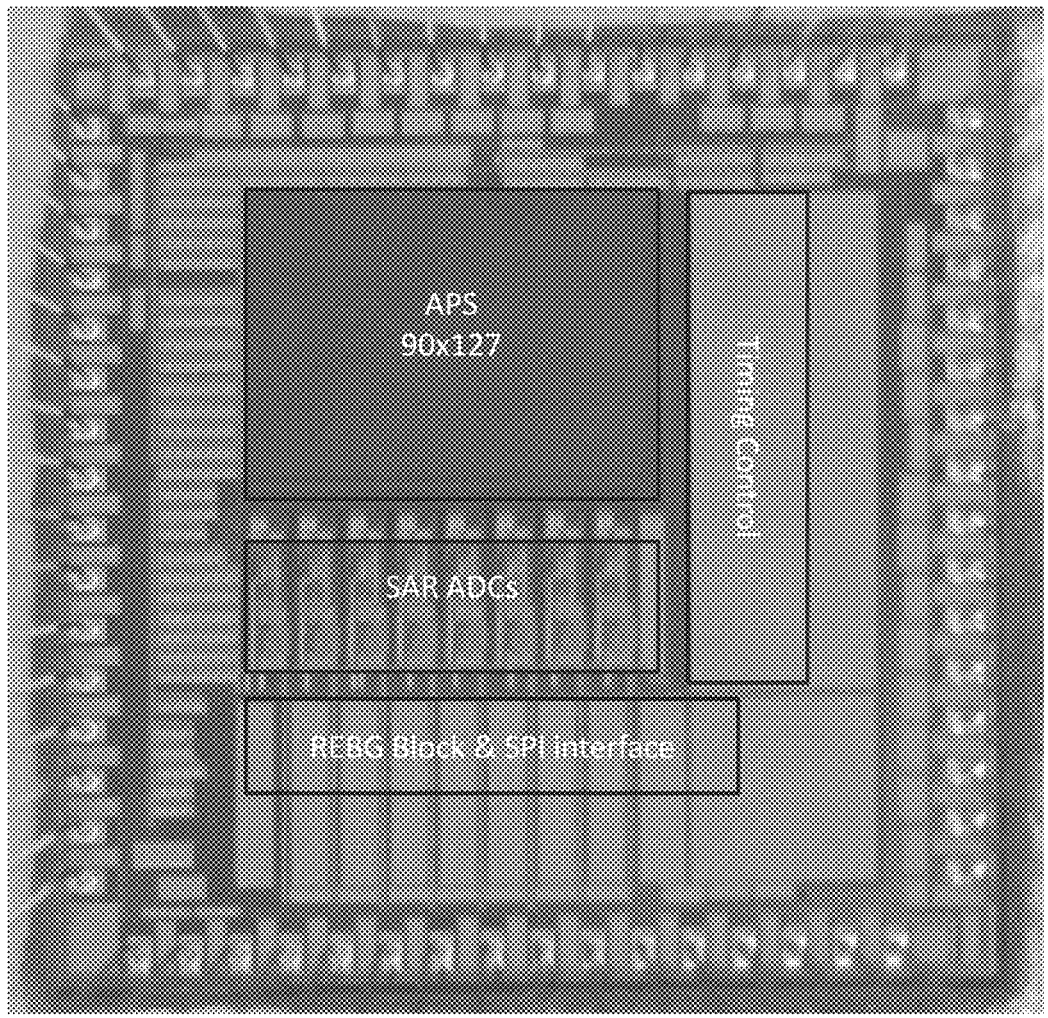
FIG. 15 illustrates a chip micrograph according to an embodiment of the present invention.

FIG. 15 shows a chip (integrated circuit) image of scene-capture device 400 using CMOS semiconductor process technology. Is this example, the scene-capture device was fabricated using a 180 nm CMOS process. However, other process techniques can be used. In the illustrated embodiment, the scene-capture device occupies an area of 3λ3 mm. The pixel array, consisting of 127×90 pixels, each of dimension 10×10 μm, occupies an area of 0.9 mm×1.27 mm. The area occupied by pixels can be increased or decreased by varying the number of pixels and/or the size of the pixels, as well as by changing the size of the scene-capture device. In the embodiment of FIG. 5, a six-transistor (6T) SRAM structure is used for exposure storage. However, in other embodiments, other SRAM structures may be used. For example, 4T, 8T, 10T and SRAM having more or less transistors can be used. The size of the SRAM can be based on the size of the memory that is needed. In the embodiment illustrated in FIG. 15, the SRAM structure and the pixel has a fill-factor of 52 percent. Other memory structures such as dynamic random access memory (DRAM) can be used providing different fill-factor percentage. The pixel dynamic range (51.2 dB), fixed pattern noise (1.02%) and random noise (5.4 Digital Number) can vary based on the selected integrated circuit fabrication process.

Figure 16:
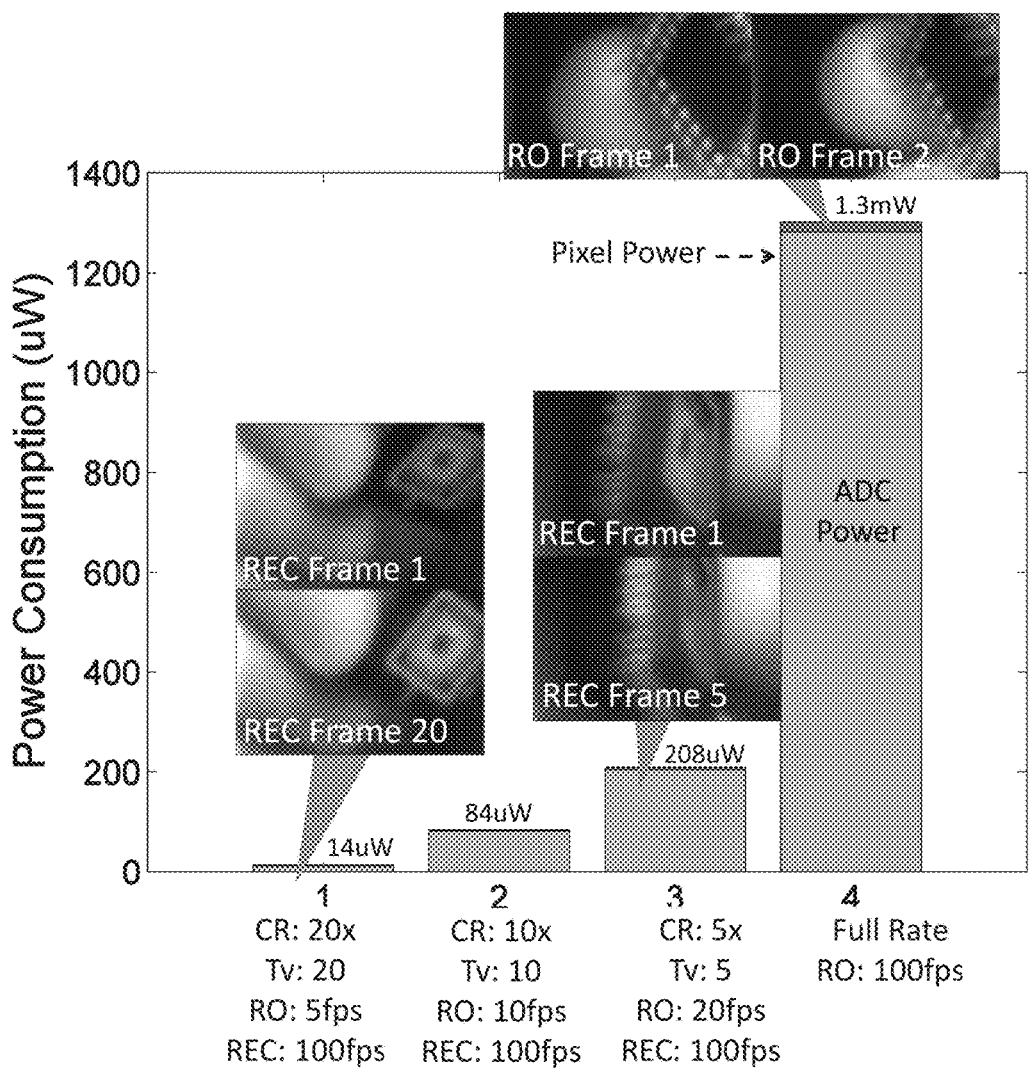
FIG. 16 is a graph of power consumption and image quality at different compression rate according to an embodiment of the present invention.

FIG. 16 shows the integrated circuit power consumption and image quality at different compression rates (CR). For the same exposure duration, a longer video frame leads to larger CR and lower power. However, a longer frame (Tv) also causes the scene-capture device to collect fewer spatial temporal samples per frame. This may lead to degradation of the reconstruction image quality.

In one embodiment, when a scene consists of many smooth surfaces, a longer video frame can be used to save power while providing acceptable video reconstruction (REC) quality. A reconstructed example of such scene is shown at Tv=20 in FIG. 16, where the scene consists of fingers and the smooth surfaces of an integrated circuit package. On the other hand, when higher detail of the scene is desired, a shorter Tv can be used to refine the REC quality. An example is shown at Tv=5, where the fine detail of the spikes in the package is well-reconstructed. For visual references, lossless images collected a full frame are also shown in FIG. 16. At CR of 20, the integrated circuit power consumption is only 14 μW compared with 1.3 mW at full rate. This corresponds to about 99% of power saving.

Table 1 shows the measured characteristics of a embodiment of the invention. It is fabricated in an 180 nm 1P6M CMOS process. The total chip power consumption at full rate is 1.73 mW and 41 μW at 20× compression.

TABLE 1

System Specifications

| Parameter | Value |
| --- | --- |
| Technology | 180 nm 1P6M RF CMOS |
| Die Size | 3 × 3 mm |
| Pixel Array Size | 0.9 × 1.27 mm |
| Power Supply | 1.8 V |
| No. of Pixels | 90 × 127 |
| Pixel Size | 10 × 10 μm |
| Fill Factor | 52% |
| Pixel Dynamic Range | 51.2 dB |
| Fpn | 1.02% (@Dark, 100 FPS) |
| Rn | 5.4 DN (@Dark, 100 FPS) |
| ADC Resolution | 12 bit |
| Dnl/Inl | <1.2/<0.8 LSB |
| UWB TX Peak Output Power | 0.028 nJ/bit |
| System Power | 1.73 mW (@100 FPS readout, full rate) |
| | 41 μW (@5 FPS readout, CR = 20×) |

As is described above, a semiconductor implementation, such as a CMOS or similar process, is much smaller in size compared to that of an optical implementation. This allows for the exposure coding to be completed directly on an image sensor having the dimensions of only a few mm². Additionally, while other implementations may call for additional optical elements, such as one or more spatial light modulators (SLMs), a semiconductor implementation eliminates the need for additional light polarization. Further, a semiconductor implementation allows for broadband incident light, reducing additional modulation and computation needed by other systems to deal with such light. The embodiments described above can be configured to only measure a greyscale level, or they can be configured for color imaging through the inclusion of conventional pixel filters and RGB pixels or other pixel layouts.

In addition to the reduction in size and complexity as compared to optical implementations, semiconductor implementations can also provide significant power savings. For example, some optical implementations can consume several watts of power while the semiconductor implementation may only consume a few microwatts.

Various potential applications for a CMOS (semiconductor) based PCE system include areas that require high frame rate and low blue image sensors having high performance under different light illumination. Further, as the sensor also provides lower power consumption, it may be particularly relevant to mobile applications due to battery size limitations. For example, some explicit applications may include miniature image sensors for mobile wireless sensor nodes and microscopy on unrestrained animals.

While certain embodiments according to the invention have been described, the invention is not limited to just the described embodiments. Various changes and/or modifications can be made to any of the described embodiments without departing from the spirit or scope of the invention. Also, various combination of elements, sets, features, and/or aspects of the described embodiments are possible contemplated even if such combinations are not expressly identified herein.

The invention claimed is:

1. A pixel for a scene capture device, said pixel comprising:
   a photodiode;
   a buffer;
   a memory element configured to store an exposure control bit; and
   a switching mechanism configured to control a variable exposure period of said photodiode based on said exposure control bit and to reset a voltage on said photodiode to a reference voltage;
   wherein:
      said switching mechanism is configured to disconnect said photodiode from said buffer and said reference voltage during said variable exposure period; or
      said switching mechanism comprises a first switch selectively coupling said photodiode to said buffer to control said variable exposure of said photodiode and a second switch configured to reset said photodiode to a reference voltage.

2. The pixel of claim 1, wherein said buffer is configured to isolate said photodiode from one or more circuit elements of said image capture device.

3. The pixel of claim 1, wherein said switching mechanism is configured to disconnect said photodiode from said buffer and said reference voltage during said variable exposure period.

4. The pixel of claim 1, wherein said variable exposure period of said photodiode differs between a first frame and a second frame.

5. The pixel of claim 1, wherein said variable exposure period of said photodiode during a first frame and a second variable exposure period of a second photodiode of said image capture device during said first frame differ.

6. The pixel of claim 1, wherein said memory element is coupled to a driver configured to provide said exposure control bit to said memory element.

7. The pixel of claim 1, wherein said switching mechanism comprises a first switch selectively coupling said photodiode to said buffer to control said variable exposure of said photodiode and a second switch configured to reset said photodiode to a reference voltage.

8. An image capture device comprising:
   a plurality of pixels comprising:
      a photodiode;
      a buffer;
      a memory element configured to store an exposure control bit; and a switching mechanism configured to control a variable exposure period of said photodiode based on said exposure control bit and to reset a voltage on said photodiode to a reference voltage;

a plurality of drivers coupled to said plurality of pixels, wherein said plurality of drivers is configured to:
  receive a random exposure sequence; and
  provide an exposure control bit to a memory element of each pixel of said plurality of pixels based on said random exposure sequence; and a plurality of analog-to-digital converters (ADCs) coupled to said plurality of pixels.

9. The image capture device of claim 8 further comprising a random exposure sequence generator configured to generate said random exposure sequence.

10. The image capture device of claim 9, wherein said random exposure sequence generator, said plurality of pixels, said plurality of drivers and said plurality of ADCs are part of a common integrated controller.

11. The image capture device of claim 10, wherein an exposure control bit of said first pixel of said plurality of pixels differs between said first frame and said second frame.

12. The image capture device of claim 9, wherein said random exposure sequence generator are part of a first integrated controller and at least one of said plurality of pixels, plurality of drivers, plurality of ADCs are part of a second integrated controller.

13. The image capture device of claim 8, wherein a variable exposure period of a first pixel of said plurality of pixels differs between a first frame and a second frame.

14. The image capture device of claim 8, wherein a variable exposure period of a first and second pixel of said plurality of pixels differ during a first frame.

15. The image capture device of claim 14, wherein a sampling time for each of the plurality of ADCs is based on said exposure control bit for each said corresponding pixel.

16. The image capture device of claim 8, wherein said random exposure sequence comprises a length equal to a number of pixels in a row of said image capture device.

17. The image capture device of claim 8, wherein each of said plurality of ADCs are configured to receive a sampling control bit corresponding to each pixel of said plurality of pixels.

18. A method for capturing a high dynamic range (HDR) image using a single capture, said method comprising:
  programming said plurality of pixels of claim 8 to have different exposure lengths; and
  acquiring pixel values from the plurality of pixels using the said plurality of ADCs of claim 8 to form a coded image.

19. The method of claim 18, wherein the coded image is processed using a low pass filter to extract a high dynamic range scene.

20. A method for reconstructing a video from a coded image, said method comprising:
  receiving pixel values and one or more corresponding exposure patterns corresponding to said coded image;
  determining an optimal video corresponding to the coded image based on a dictionary by solving an inverse problem with said dictionary for said pixel values; and
  outputting said optimal video to an storage device.

21. The method of claim 20, wherein said dictionary is a sparsifying dictionary.

22. The method of claim 21, wherein said sparsifying dictionary is an overcomplete dictionary.

* * * * *